July 13, 1965 H. I. WEST, JR 3,195,123

ANALOGUE TO DIGITAL CONVERTER

Filed June 8, 1961 2 Sheets-Sheet 1

INVENTOR.
HARRY I. WEST JR.
BY
Roland A. Anderson
ATTORNEY

July 13, 1965 H. I. WEST, JR 3,195,123

ANALOGUE TO DIGITAL CONVERTER

Filed June 8, 1961 2 Sheets-Sheet 2

INVENTOR.
HARRY I. WEST JR.

BY

Roland A. Anderson

ATTORNEY

United States Patent Office 3,195,123
Patented July 13, 1965

3,195,123
ANALOGUE TO DIGITAL CONVERTER
Harry I. West, Jr., Livermore, Calif., assignor to the United States of America as represented by the United States Atomic Energy Commission
Filed June 8, 1961, Ser. No. 115,829
6 Claims. (Cl. 340—347)

Figure 1:
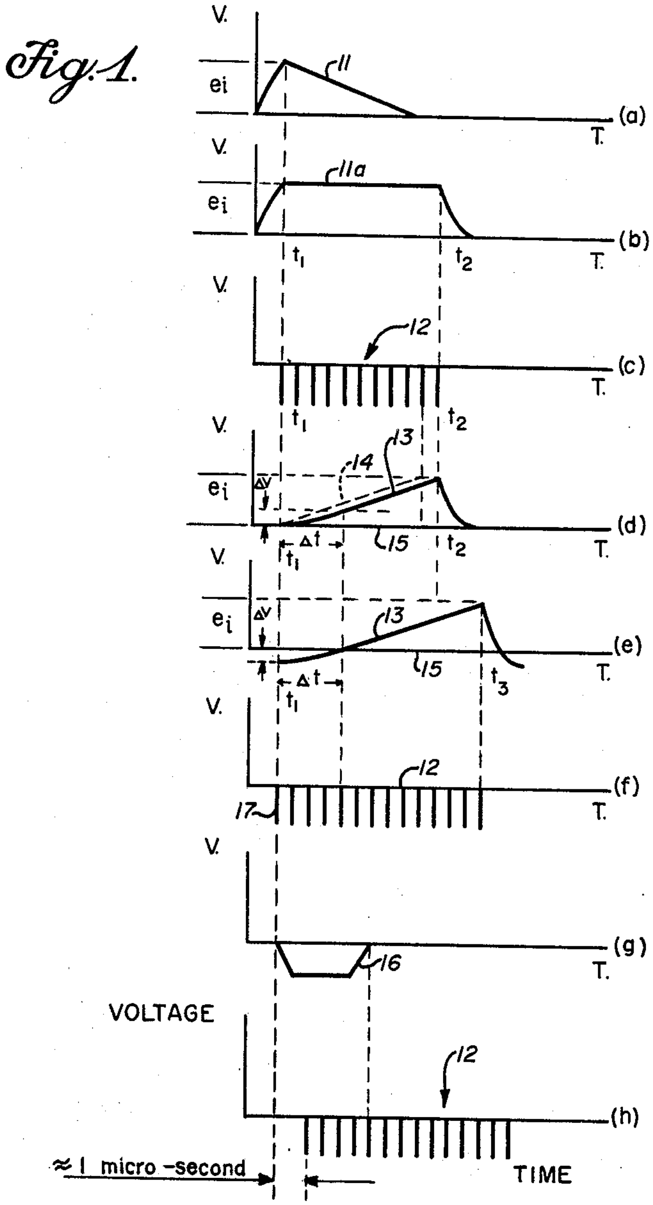

The present invention relates to the electronic conversion of data in analogue form to digital form and, more particularly, to analogue to digital converters utilizing linear ramps and pulse trains to achieve the desired conversion.

It is often required that data taken in a physical system be delivered directly to a digital computer for processing. An area where analogue to digital converters find active use and perform a vital operation is in the nuclear radiation detection art. Numerous devices exist for transducing nuclear radiation to electrical pulses. The height of the pulses which result from the impinging radiation can furnish a measure of the energy of the radiation or the quantity of the radiation. The electrical pulses become useful information when processed by an analogue to digital converter.

One of the most popular systems for converting analogue data into digital form involves a time modulation scheme of high precision. In this system, a continuous series of equally-spaced pulses is passed through a gate. The gate is normally closed and is opened at the instant of the beginning of a linear sweep. The gate remains open until the linear-sweep voltage attains the reference level of a comparator, which comparator level is set equal to the analogue voltage to be converted. The number of pulses in the train which pass through the gate is therefore proportional to the analogue voltage. One of the most critical elements of this system for obtaining accurate results is the linear-sweep voltage.

The linear-sweep voltage of the system described above, generates what is commonly known as a linear ramp. It is at once obvious that the accuracy of the overall system is closely related to the accuracy with which the linear-sweep voltage creates a true linear ramp. Whereas nonlinearities in the ramp will create error in all of the data processed, it will be most detrimental to data of a low-level nature which requires only a very short ramp. Thus, scientific investigations which require the conversion of data from analogue to digital form, and contain low-level data, will be subjected to serious error.

The problem presented by the nonlinearity in a linear ramp is met in numerous ways. The most common method of confronting the problems involved is to attempt to predict what the error is and compensate for it by a "fudge factor." Another method is to employ highly elaborate electronic components so as to generate a linear ramp with the least amount of nonlinearity possible; and there are those situations where one is forced to accept the system with the inherent inaccuracies for the lack of an alternative. At best, these methods serve to minimize the error; none remove it.

The present invention provides means by which a system utilizing a linear ramp may operate with extremely high accuracy, regardless of the level of the data, and without the addition of highly complicated, electronic-ramp generating means. This most desirable result is achieved by capitalizing upon the fact that a linear ramp suffers nonlinearities only in the initial portion of the ramp. By allowing the system to operate only in that portion of the linear ramp which does not include nonlinearities, the present invention provides a system of much improved accuracy. With the use of a gating circuit, the system of the present invention effectively eliminates the non-linear initial portion of the linear ramp and extends the linear terminal portion of the linear ramp a sufficient amount to compensate for the data originally collected under the eliminated initial portion of the linear ramp. This allows the system to operate under a ramp having precise linearity throughout.

Accordingly, it is the object of the present invention to provide means for improving the accuracy of an analogue to digital converter utilizing a linear-ramp system.

Figure 2:
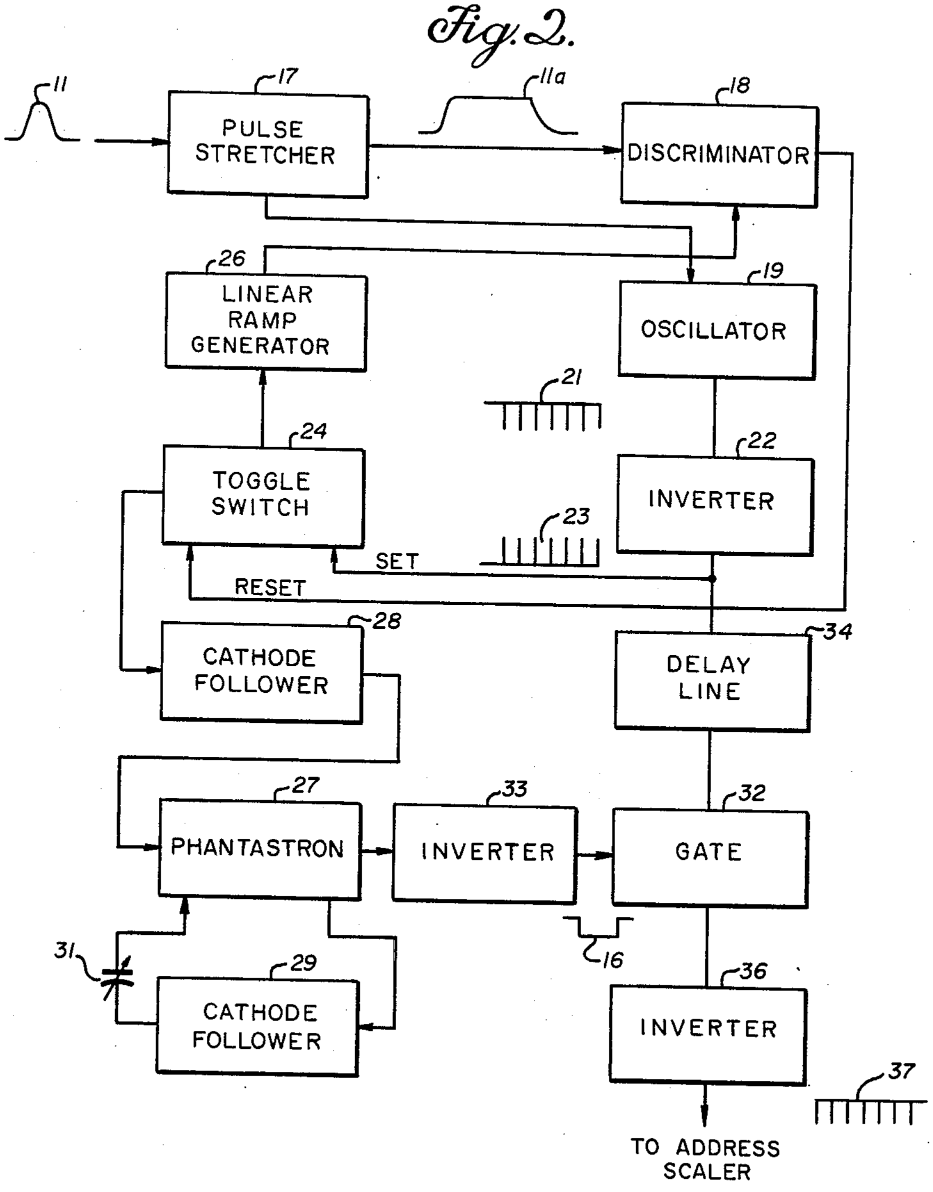

Other objects and advantages of the invention will be apparent from the following detailed description taken together with the drawings, in which:

FIGURE 1 is a series of voltage-versus-time graphs which illustrate the operation of the present invention, and FIGURE 2 is a schematic block diagram of the gating circuit of the present invention in conjunction with a pulse height analyzer utilized in a typical analogue to digital converter.

Referring now to FIGURE 1, an information voltage pulse 11 having a magnitude $e_1$ is displayed on a voltage-versus-time graph (*a*). Pulse 11 is indicative of the physical responses from an experimental setup measuring a particular variable, such as gamma radiation particle energy. The information contained in pulse 11 is indicated by its magnitude. This is to say, that a change in the value of $e_1$ indicates a change in the physical quantity being measured. Pulse 11 is introduced to an analogue to digital converter for the purpose of transforming the information of pulse 11 into a form which can be operated upon for analytical purposes.

The primary step performed by an analogue to digital converter of the type to which the present invention relates is to stretch the analogue pulse 11. Voltage-versus-time graph (*b*) illustrates the result that the stretching step in the form of pulse 11*a*. It is seen that when pulse 11 reaches its maximum height, $e_1$ at some time $t_1$, the pulse is maintained at that height until some later time $t_2$, when it is allowed to decay. At the same time, $t_1$, that pulse 11 reaches its maximum voltage, $e_1$, a pulse train 12, as shown in graph (*c*), is initiated and allowed to run until the time $t_2$. The pulses which comprise pulse train 12 are evenly spaced and most advantageously of a high frequency, such as two megacycles. If pulse train 12 is of the two megacycle variety, then the time between pulses will be one-half of one microsecond.

At the same time, $t_1$, that stretching of pulse 11 is started, and pulse train 12 is initiated, a voltage ramp 13 is generated as shown in graph (*d*). Ramp 13 is generated by a linear-ramp generating means which, in fact, does not generate a truly linear ramp. Assuming for the present that ramp 13 is truly linear, the voltage magnitude generated by the ramp generating means will be proportional to the length of time which the ramp is being generated. Pulse height analyzers, which are of the type to which the present invention relates, operate such that when the voltage magnitude of the linear ramp 13 is equal to the magnitude of the "stretched" pulse 11*a*, the stretching mechanism discontinues to operate and allows pulse 11*a* to decay; pulse train 12 is terminated; and the ramp generating means is shut off. As seen in graph (*d*) of FIGURE 1, ramp 13 reaches the height $e_1$ of "stretched" pulse 11*a* at time $t_2$. The number of pulses contained in pulse train 12 is proportional to the length of time which ramp 13 operated, which in turn is proportional to the maximum height of the pulse 11. In this way, the number of pulses in train 12 contains the same information that was contained in pulse 11, and the conversion from analogue to digital form is thereby completed.

Graphs (*a*), (*b*), (*c*), and (*d*), and the discussion supra, are illustrative of the conventional manner in which a pulse analyzer converts analogue data to a digital form. It is clear that numerous factors enter into the accuracy with which the conversion is made. One factor which has presented the most difficulty in achieving a highly accurate conversion is the linearity of ramp 13. The ramp generating means of most conventional pulse height analyzers does not in fact generate a linear ramp for a time $\Delta t$, beginning at time $t_1$. Although the time $\Delta t$ may be very short for pulse height analyzers of the most refined nature, it does exist for some finite time which is sufficient to cause sizable inaccuracies in conversion performed by pulse height analyzers of the most popular varieties. Where the time between $t_1$ and $t_2$ is very, very great compared to the time $\Delta t$, it can be seen that little error will be introduced by the nonlinearity existing over the time $\Delta t$. When, however, the time between $t_1$ and $t_2$ is comparable to the time $\Delta t$, inaccuracies which distort the data by high percentages will be introduced. Thus, pulse height analyzers utilized in conjunction with experiments that produce physical data of a low level (produce pulse 11 of low magnitude), often find that accuracy is greatly compromised. This is illustrated by noting that the number of full pulses in train 12 between time $t_1$ and $t_2$ is eleven. If, however, a truly linear ramp 14 had been generated, the number of pulses generated in train 12 during the time ramp 14 was increasing to $e_1$ volts would have been ten. The error introduced is, therefore, approximately ten percent due to the seemingly slight nonlinearity of ramp 13 for the time $\Delta t$.

In graph (*d*) it can be seen that ramp 13 starts at a reference voltage level 15 at time $t_1$ and rises to a voltage $\Delta v$ during the time interval $\Delta t$. After the time $\Delta t$, however, ramp 13 is linear. In graph (*e*) of FIGURE 1, ramp 13 is seen to be initiated at time $t_1$ at a voltage level $\Delta v$ below the reference voltage line 15. Since the nonlinear portion of ramp 13 rises an amount $\Delta v$ during the time interval $\Delta t$, ramp 13 will necessarily intercept the reference voltage line 15 at the end of the $\Delta t$ time period. Between the end of the $\Delta t$ time period to a time $t_3$, linear ramp 13 will reach a magnitude which is equal to the magnitude of pulse 11*a*, namely $e_1$. By initiating ramp 13 $\Delta v$ volts below the reference voltage line, ramp 13 must increase in magnitude a voltage $e_1$ plus $\Delta v$. Inasmuch as $e_1$ plus $\Delta v$ is necessarily greater than $e_1$, ramp 13 will be generated for a greater length of time than if it had been initiated at the reference voltage level 15 at time $t_1$. This necessarily means that the number of pulses in pulse train 12 will be greater than if ramp 13 had been initiated at the reference voltage level. It is necessary, therefore, if accurate results are to be obtained, to eliminate the pulses which are generated during the time $\Delta t$ and allow only those pulses which are generated during the time between the end of $\Delta t$ and $t_3$ to be counted.

The elimination of the pulses in train 12 of graph (*f*) which are accumulated during the time $\Delta t$ is accomplished by means of an electronic gate. A gating pulse 16 of graph (*g*) is introduced to an electronic gate which serves to eliminate all pulses which enter the gate during the duration of gating pulse 16. When pulse 16 is not present, the pulses pass freely through the gate, unacted upon. The gating pulse 16 is generated at the same time, $t_1$, as ramp 13 and train 12.

To insure that gating pulse 16 reaches its most negative value and is therefore 100% effective in preventing the passage of pulses of train 12 during its duration, it is advantageous to send pulse train 12 through an electronic delay line before introducing it to the electronic gate. Thus, if a one-microsecond delay line is utilized, gating pulse 16 will "close" the gate one microsecond before the first pulse of train 12 is received thereby. Graph (*h*) illustrates the pulse train 12 after it has passed through delay line 12 and therefore one microsecond later in time than train 12 of graph (*f*).

It is seen on either graph (*d*) or (*e*) that $\Delta t$ for the example illustrated in FIGURE 1 is approximately two microseconds. Thus, it is desirable for the gating pulse 16 to have an effective duration of two microseconds to eliminate the pulses of train 12 which are generated during the time ramp 13 is nonlinear. The pulse generator which generates gating pulse 16 is of a variable nature and may, therefore, be adjusted to produce a gating pulse 16 having a time duration which is equal to the length of time $\Delta t$ for any particular system. With the "nonlinear" pulses of train 12 of graph (*h*) being eliminated by the electronic gate, only the remaining pulses are used for the conversion of the information of pulse 11. Although it appears that train 12 of graph (*h*) continues beyond the time when ramp 13 terminates, it in fact does not when it is recalled that graph (*h*) is delayed one microsecond in time. It is to be noted that only ten pulses (the correct number as pointed out supra) are included in train 12 of graph (*h*) as representing the magnitude of pulse 11.

The discussion supra, accompanied with FIGURE 1, illustrates graphically the manner in which the present invention operates to eliminate the undesirable effects of the nonlinearities accompanying a linear ramp system. Inasmuch as the mechanism required to stretch pulse 11, initiate pulse train 12, and generate ramp 13 are inherent in pulse height analyzers of the type to which the present invention relates, the advancement taught by the present invention may be operated by the proper introduction of relatively simple components for generating a gating pulse and an electronic gate which is responsive thereto.

An example of a physical system for performing the functions as described supra is shown in FIGURE 2 where an information pulse 11 is received by a pulse stretcher 17 which responds thereto by an output of a voltage wave having a voltage magnitude equal to the maximum voltage of pulse 11. "Stretched" pulse 11*a*, from pulse stretcher 17, is then delivered to a discriminator circuit 18 where it is compared against a linear ramp voltage. When pulse 11 reaches its maximum height in pulse stretcher 17, a signal is sent to a two megacycle oscillator 19. Oscillator 19 is described as being of the two megacycle variety, for example purposes only as described supra, and oscillators of other high frequencies could be utilized as well. The signal from pulse stretcher 17 to oscillator 19 initiates oscillator action and a pulse train 21 results as the output therefrom. The pulses which form train 21 from oscillator 19 are generally negative pulses (for computing purposes), but are most advantageously acted upon by a gate if they are positive. Thus, they are sent through an inverter 22 to form a train 23 of positive pulses of the same frequency as train 21. The first pulse of train 21 through inverter 22, activates (sets) a toggle switch 24 which, in turn, initiates a pulse which starts linear ramp generator 26 generating a voltage ramp.

The linear ramp voltage from generator 26 is introduced to discriminator 18 and compared with the pulse 11*a* from pulse stretcher 17. When the voltage magnitude of the ramp from generator 26 equals the voltage magnitude of the pulse from stretcher 17, a reset pulse is issued from discriminator 18 to toggle 24, which results in the termination of ramp generation by generator 26; stretching by pulse stretcher 17; and pulse generating by oscillator 19. The number of pulses that pass through inverter 22 to form pulse train 23 during the time oscillator 19 was active, represents the maximum magnitude of the pulse 11 which was initially introduced to pulse stretcher 17. In a conventional pulse height analyzer, train 23 would then be directed to an address scaler and become information stored in the pulse height analyzer.

As pointed out supra, the inability of linear ramp generator 26 to generate a ramp which does not contain nonlinear portions, causes train 23 to have a number of pulses therein which is not exactly proportional to the maximum magnitude of pulse 11.

To remedy this situation, the present invention teaches the use of supplementary circuitry in connection with the circuitry of the conventional pulse height analyzer described above. When toggle switch 24 activates linear ramp generator 26, a phantastron circuit 27, utilized as a pulse generator, is similarly activated through a cathode follower circuit 28. A positive pulse is present at the screen grid of the phantastron tube for the interval of the linear rundown. Whereas pulse generator 27 is exemplified by a phantastron pulse circuit, this is not to indicate that other circuits capable of issuing an output of a square wave in response to an input pulse would not also operate sufficiently to perform the necessary functions to achieve the results of the present invention. A phantastron circuit, however, has exceptional stability and recovery times and is therefore a preferred pulse generator for use with the present invention. To further increase the recoverability of generator 27, and render the output thereof variable, a cathode follower circuit 29 in series connection with a variable capacitor 31 is connected to the plate of the tube in feedback relation to the generator 27. Adjustment of capacitor 31 controls the width of the gating pulse output of pulse generator 27 and thereby serves to furnish the correction circuit of the present invention with the ability to service pulse height analyzers with varying degrees of nonlinear voltage ramps.

An electronic gate 32 for eliminating the "nonlinear" pulses from train 23 is closed by means of a negative gating pulse which is introduced thereto from pulse generator 27. Inasmuch as a phantastron pulse generator has an output which is positive going, an inverter 33 receives the output of generator 27 and inverts it before the gating pulse 16 enters gate 32. The gating pulse 16 enters gate 32 at the precise instant that the first pulse of train 23 emerges from inverter 22. Pulse train 23 is passed through gate 32 for the purpose of eliminating those first few pulses which were generated from oscillator 19 during the time in which the ramp from linear ramp generator 26 was, in fact, nonlinear. To insure that the gating pulse 16, from phantastron pulse generator 27, is at its lowest and most effective value in gate 32 at the time train 23 enters gate 32, a one microsecond delay line 34 is electrically interposed inverter 22 and gate 32. Thus, gating pulse 16 enters gate 32 one microsecond before the first pulse of train 23 enters, and the full effect of gating pulse 16 is thereby insured.

The effect of gating by gate 32 is that the pulses 37 which flow from the output of gate 32 include only those pulses which were generated during the truly linear operation of ramp generator 26. Pulses 37, which are truly proportional in number to the maximum magnitude of pulse 11, are conveyed to an address scaler (after going through another inverter 36 to make them negative again) in the pulse height analyzer and there stored for further use.

As pointed out in connection with FIGURE 1, it is necessary for the proper functioning of the present invention that linear ramp generator 26 generate a voltage ramp which begins at a voltage level sufficiently below the reference voltage level to insure that the voltage ramp generated about the reference level contain no nonlinearities. It is also important to know the time required by ramp generator 26 to generate a voltage which is sufficient to bring the voltage ramp potential to the reference voltage level 15. This same time will be that required for gate 32 to be closed and, thus, the adjustment of capacitor 31 will depend thereon. These critical voltages and times are easily determined by standard methods well within the knowledge of those active in the art.

Gate 32 may be any one of a number of electronic devices which responds to gating pulse by becoming an effective "open circuit." Such devices include diodes, transistors, vacuum tubes, etc. The basic requirements of a gate of the present invention is that it be fast-acting and highly efficient.

What is claimed is:

1. In a device for converting analogue information to digital information employing a time modulation scheme, the combination comprising:

(a) a pulse train generator responsive to an electrical signal representative of the analogue information to be converted by generating a train of pulses;

(b) means for generating a voltage ramp in response to a pulse from said pulse train generator, said ramp of voltage having a nonlinear portion;

(c) means for generating a gating pulse in response to a predetermined pulse from said pulse train generator, said predetermined pulse corresponding with the commencement of the nonlinear portion of the generated ramp;

(d) electronic gating means for receiving said gating pulse and through which said pulse train passes, said gating means actuated by said gating pulse at a time no later than the arrival thereat of the first pulse of said pulse train corresponding to the commencement of the non-linear portion of the voltage ramp to prevent the passage of the pulses of said pulse train generated during the nonlinear portion of said voltage ramp;

(e) and comparison circuit means responsive to a predetermined voltage level of said voltage ramp by generating a reset signal, said reset signal being electrically introduced to said voltage ramp generating means and said pulse train generator to terminate the generation of said voltage ramp and said pulse train.

2. An analogue to digital converter as recited in claim 1 further defined by said comparison circuit means being a discriminator type circuit, and said predetermined voltage level being representative of the maximum amplitude of the analogue information to be converted.

3. In a device for converting analogue information to digital information employing a time modulation scheme, the combination comprising:

(a) a pulse train generator responsive to an electrical signal representative of the analogue information to be converted by generating a train of pulse;

(b) means for generating a voltage ramp in response to a pulse from said pulse train generator, said ramp of voltage having a nonlinear portion;

(c) bias means electrically connected to said voltage ramp generator to establish the initial potential level of said voltage ramp below a predetermined reference voltage level so that the beginning of the linear portion of said voltage ramp substantially coincides with said predetermined reference voltage level;

(d) means for generating a gating pulse in response to a predetermined pulse from said pulse train generator, said predetermined pulse corresponding with the commencement of the nonlinear portion of the generated ramp;

(e) electronic gating means for receiving said gating pulse and through which said pulse train passes, said gating means actuated by said gating pulse at a time no later than the arrival thereat of the first pulse of said pulse train corresponding to the commencement of the non-linear portion of the voltage ramp to prevent the passage of the pulses of said pulse train generated during the nonlinear portion of said voltage ramp;

(f) and comparison circuit means responsive to a predetermined voltage level of said voltage ramp by generating a reset signal, said reset signal being electrically introduced to said voltage ramp generating means and said pulse train generator to terminate the generation of said voltage ramp and said pulse train.

4. In a device for converting analogue information to digital information employing a time modulation scheme, the combination comprising:

(a) a pulse train generator responsive to an electrical signal representative of the analogue information to be converted by generating a train of pulse;

(b) means for generating a voltage ramp in response to a pulse from said pulse train generator, said ramp of voltage having a nonlinear portion;

(c) bias means electrically connected to said voltage ramp generator to establish the initial potential level of said voltage ramp below a predetermined reference voltage level so that the beginning of the linear portion of said voltage ramp substantially coincides with said predetermined reference voltage level;

(d) means for generating a gating pulse in response to a predetermined pulse from said pulse train generator, said predetermined pulse corresponding with the commencement of the nonlinear portion of the generated ramp;

(e) electronic gating means for receiving said gating pulse and through which said pulse train passes, said gating means responsive to said gating pulse by preventing the passage of the pulses of said pulse train generated during the nonlinear portion of said voltage ramp;

(f) electronic delay means interposed said pulse train generator and said gating means;

(g) and comparison circuit means responsive to a predetermined voltage level of said voltage ramp by generating a reset signal, said reset signal being electrically introduced to said voltage ramp generating means and said pulse train generator to terminate the generation of said voltage ramp and said pulse train.

5. An analogue to digital converter as recited in claim 4 wherein said delay means causes a delay time equal substantially to the time of four pulses of said pulse train.

6. In a device for converting analogue information to digital information employing a time modulation scheme, the combination comprising:

(a) a pulse stretcher responsive to the analogue information to be converted by generating both a voltage step representative of the maximum amplitude of said analogue information and a gate signal;

(b) a pulse train generator responsive to said gate signal by generating a train of pulses for the duration of the gate signal;

(c) means for generating a voltage ramp in response to a first pulse from said pulse train generator, said voltage ramp having a nonlinear portion;

(d) bias means electrically connected to said voltage ramp generator, said bias means being adjusted to establish the initial potential level of said voltage ramp below a predetermined reference voltage level so that the beginning of the linear portion of said voltage ramp coincides with said predetermined reference voltage level;

(e) a phantastron pulse generator responsive to the first pulse of said pulse train by the output of a positive gating pulse;

(f) a cathode follower circuit and variable capacitor connected in series and in feedback relation to said pulse generator;

(g) an inverter circuit receiving the output of said pulse generator to reverse the polarity of the gating pulse;

(h) electronic gating means for receiving said gating pulse and through which said pulse train passes, said gating means responsive to said gating pulse by preventing the passage of the pulses of said pulse train generated during the nonlinear portion of said voltage ramp;

(i) electronic delay means interposed said pulse train generator and said gating means, said delay means causing a delay time substantially equal to the time of four pulses of said pulse train; and (j) a discriminator circuit receiving said voltage ramp and said voltage step to compare the amplitude of said voltage ramp to the amplitude of said voltage step and generate an electrical signal when the amplitudes are equal, said generated electrical signal electrically introduced to said voltage ramp generating means and said pulse stretcher to terminate the generation of said voltage ramp, said voltage step and gate signal.

References Cited by the Examiner

UNITED STATES PATENTS

| | | | |
|---|---|---|---|
| 2,781,970 | 2/57 | Kaufman | 340—347 |
| 2,787,418 | 4/57 | MacKnight et al. | 340—347 |
| 2,804,606 | 8/57 | Reaves | 340—213 |
| 2,824,285 | 2/58 | Hunt | 340—347 |
| 3,028,550 | 4/62 | Naydan | 340—347 |

MALCOLM A. MORRISON, *Primary Examiner.*